US006615358B1

(12) United States Patent
Dowd et al.

(10) Patent No.: US 6,615,358 B1
(45) Date of Patent: *Sep. 2, 2003

(54) FIREWALL FOR PROCESSING CONNECTION-ORIENTED AND CONNECTIONLESS DATAGRAMS OVER A CONNECTION-ORIENTED NETWORK

(76) Inventors: Patrick W. Dowd, 5130 Durham Rd. West, Columbia, MD (US) 21044; John T. McHenry, 911 Skyhill La., Odenton, MD (US) 21113

(*) Notice: Subject to any disclaimer, the term of this patent is extended or adjusted under 35 U.S.C. 154(b) by 0 days.

This patent is subject to a terminal disclaimer.

(21) Appl. No.: 09/287,655

(22) Filed: Apr. 7, 1999

Related U.S. Application Data

(60) Provisional application No. 60/095,647, filed on Aug. 7, 1998.

(51) Int. Cl.[7] .......................... G06F 11/30; H04L 12/56
(52) U.S. Cl. ................... 713/201; 370/229; 370/395.52
(58) Field of Search ................................ 713/200, 201; 709/223–225, 230, 231, 238, 245; 370/389, 392, 393, 395.52, 395.5, 395.51, 400, 401, 395.1, 229, 230, 235

(56) References Cited

U.S. PATENT DOCUMENTS

| | | | |
|---|---|---|---|
| 5,113,499 A | * 5/1992 | Ankney et al. | 395/325 |
| 5,420,858 A | * 5/1995 | Marshall et al. | 370/60.1 |
| 5,606,668 A | 2/1997 | Shwed | |
| 5,623,601 A | 4/1997 | | |

(List continued on next page.)

(List continued on next page.)
Vu

OTHER PUBLICATIONS

Tanenbaum, "Computer Networks" 1996, Prentice Hall PTR, Third Edition, p. 23–25,61–67.*

(List continued on next page.)

Primary Examiner—Gail Hayes
Assistant Examiner—Christopher Revak
(74) Attorney, Agent, or Firm—Robert D. Morelli

(57) ABSTRACT

The present invention is a device for and method of accessing an information network by initializing a database, an ATM approved list, an IP approved list, and an IP disapproved list; receiving a datagram; discarding the datagram if it is not on the ATM approved list; determining the datagram's type; allowing access to the network and comparing the connection request, if any, to the database if the datagram is ATM signaling; discarding the datagram if the datagram is ATM signaling and the database denies the request; adding the request to the ATM approved list if the datagram is ATM signaling and the database allows the request; allowing access to the network if the datagram is ATM data that excludes IP data and the request is on the ATM approved list; computing a flow tag if the datagram is ATM data that includes IP data; discarding the datagram if the flow tag is on the IP disapproved list; allowing access to the network if the flow tag is on the IP approved list; comparing the flow tag to the database if the flow tag is neither on the IP approved list nor on the IP disapproved list; discarding the datagram and adding the flow tag to the IP disapproved list if the database rejects the flow tag; and allowing access to the network and adding the flow tag to the corresponding approved list if the database accepts the flow tag; and performing these steps on the next datagram

22 Claims, 6 Drawing Sheets

U.S. PATENT DOCUMENTS

| | | | | |
|---|---|---|---|---|
| 5,752,003 A | * | 5/1998 | Hart | 395/500 |
| 5,802,320 A | | 9/1998 | Baehr et al. | |
| 5,826,014 A | | 10/1998 | Coley et al. | |
| 5,828,833 A | | 10/1998 | Belville et al. | |
| 5,828,844 A | | 10/1998 | Civanlar et al. | |
| 5,828,846 A | | 10/1998 | Kirby et al. | |
| 5,835,726 A | | 11/1998 | Shwed et al. | |
| 5,835,727 A | | 11/1998 | Wong et al. | |
| 5,842,040 A | | 11/1998 | Hughes et al. | |
| 5,892,924 A | * | 4/1999 | Lyon et al. | 395/200.75 |
| 5,920,705 A | * | 7/1999 | Lyon et al. | 395/200.7 |
| 6,052,803 A | * | 4/2000 | Bhatia et al. | 714/49 |
| 6,272,129 B1 | * | 8/2001 | Dynarski et al. | 370/356 |
| 6,330,239 B1 | * | 12/2001 | Suzuki | 370/395 |
| 6,366,582 B1 | * | 4/2002 | Nishikado et al. | 370/401 |
| 6,385,171 B1 | * | 5/2002 | Takase et al. | 370/235 |
| 6,389,021 B1 | * | 5/2002 | Horikawa | 370/395 |
| 6,438,104 B1 | * | 8/2002 | Fodor et al. | 370/230 |
| 6,504,844 B1 | * | 1/2003 | Keller-Tuberg | 370/397 |
| 6,510,154 B1 | * | 1/2003 | Mayes et al. | 370/389 |

OTHER PUBLICATIONS

Villamizar, "IP over ATM, framework draft" Nov. 28, 1994, http://cell–relay.indiana.edu/mhonarc/ipatm/1994–Nov/msg00100.html, p. 1–5.*

Boswell et al, "Support for heterOgeneous communication infrastructure in the HLA RTI" 1999, http://dss.ll.mit.edu/dss.web/99S0SIW–105.html, p. 1–13.*

"Is IPv6 in trouble? An analysis of IPv4 solutions to IPv6 features".*

Descasper et al, :Crossbow: A toolkit for integrated services over cell switched IPv6 1997, http://216.239.33.100/search?q=cache:3v... ernhardPlattner–2.ps.gz+&hl=en&ie=UTF–8, p. 1–10.*

"An FPGA–Based Coprocessor for ATM Firewalls", IEEE Computer Society, Los Alamitos, CA, Apr. 16, 1997, Proceedings, The 5$^{th}$ Annual IEEE Symposium on Field–Programmble Custom Computing Machines, John T. McHenry, Patrick W. Dowd, et al. pp 30–39.

* cited by examiner

FIREWALL FOR PROCESSING CONNECTION-ORIENTED AND CONNECTIONLESS DATAGRAMS OVER A CONNECTION-ORIENTED NETWORK

This application claims the benefit of U.S. Provisional Application No. 60/095,647, filed Aug. 7, 1998.

FIELD OF THE INVENTION

The present invention relates, in general, to information processing system organization and, in particular, to input and output data processing flow controlling.

BACKGROUND OF THE INVENTION

A firewall is a device for, or method of, controlling the connectivity of one computer network to another. A firewall is commonly referred to as a packet filter or a gateway and is used, mainly, to provide security for a computer network. For example, a user may wish to have a private computer network be remotely accessible from a public computer network by certain users (e.g., employees) but not by others (e.g., hackers). Here, a firewall may be placed between the private computer network and the public computer network to allow only authorized users to access the private computer network from the public network.

An example of a public computer network is the Internet. Communication over the Internet is conducted using certain protocols. These protocols allow users with different computers and different operating systems to communicate with each other over the Internet. Typical Internet protocols include the Transmission Control Protocol (TCP) and the Internet Protocol (IP). Other Internet-compatible protocols are based on TCP and IP.

In IP, a data stream to be transmitted is divided into a number of packets, where each packet contains the same IP header information. A source address and a destination address of the data stream are added to each packet along with instructions on how to recombine the packets to obtain the original data stream. The source address identifies from where in the network the packet came while the destination address identifies to where in the network the packet is to be sent (i.e., the endpoint, or collection of endpoints, of the data stream). A series of packets, each identified by the same source address and the same destination addresses is commonly referred to as a flow. With these addresses, there is no need for the packet to take the same route to the destination address. By allowing the packets to travel different routes, the sudden unavailability of a transmission path over which previously transmitted packets travelled will not result in an incomplete transmission. Here, subsequently transmitted packets would be sent over a different available transmission path. Since IP does not require data to be sent over a single fixed connection, a network that employs IP is commonly referred to as a connectionless network. A goal of a connectionless network is to increase the probability that a data stream will reach its destination address, but there is a performance penalty (e.g., transmission time, latency, variance of delay, etc.) associated with the additional information added to each packet. To satisfy the need for higher performance, a communication protocol named Asynchronous Transmission Mode (ATM) was developed.

In ATM, communication takes place in two steps. In the first step is to establish a transmission path over which a data stream will be transmitted. Since the data stream will be sent over the established transmission path, ATM is commonly referred to as a connection-oriented network. A signal containing a request to establish a transmission path is transmitted in segments, where each segment is referred to as an ATM cell and, more particularly, as an ATM signalling segment. The transmitted segments are reassembled at the destination address to reconstruct the connection request the connection request is then analyzed to determine whether or not to establish the transmission path.

If the transmission path is established, the second step is to transmit the data stream. The data stream is transmitted in segments, where each segment is also be referred to as an ATM cell but, more particularly, as an ATM data segment. The transmitted ATM data segments are then recombined at the destination address to for the original data stream.

A transmission path may include more than one node or link. For each link in the transmission path there must be two switches, one for the data stream to enter the link and one for the data stream to exit the link. In ATM, information must be maintained that identifies all of the links and switches that comprise the transmission path used to transmit a data stream. Instead of storing all of this information at one location, portions of the information are distributed throughout the network switches along the transmission path.

Information is added to the header of each segment to determine how to forward the cell to the next point, or hop, in the path to the destination address. The header for a segment has only edge-level significance (i.e., hop-to-hop), not end-to-end significance (i.e., source-to-destination). The header does not identify the source or the destination of the segment, but only provides enough information for the segment to be processed at the next hop in the path. Information that identifies the final destination of each segment is not included in the header, since all of the segments transmitted along a given transmission path follow the same route. For this reason, the headers in connectionless networks (i.e., IP) tend to be larger than headers in connection-oriented networks (i.e., ATM). The smaller header sizes and fixed cel sizes of the connection-oriented networks make it easier for the switches to process the information. Therefore, connection-oriented networks tend to be efficient and support high transmission speeds.

Some networks combine IP and ATM by transmitting IP packets over an ATM transmission channel. This is commonly referred to as IP over ATM. Here, an IP packet is divided into segments. Each segment is then made part of an ATM data segment and transmitted over the ATM network as an ATM cell.

Simply combining the capabilities of an ATM firewall with those of an IP firewall does not, necessarily, yield a more efficient or more secure firewall for an IP over ATM network. The present invention is a secure and efficient firewall that applies a security posture to connectionless network data packets (e.g., IP data packets) transmitted over a connection-oriented network (e.g., ATM).

The closest prior art to the present invention appears to be the present inventor's own previous work published in a paper entitled "An FPGA-Based Coprocessor for ATM Firewalls," by the IEEE Computer Society, Los Alamitos, Calif., on Apr. 16, 1997, in *Proceedings, The 5th a Annual IEEE Symposium on Field-Programmable Custom Computing Machines*. The device disclosed in this publication is the subject of a patent application Ser. No. 09/059,041, filed Apr. 13, 1998, entitled "FIREWALL SECURITY APPARATUS FOR HIGH-SPEED CIRCUIT SWITCHED NETWORKS which is now U.S. Pat. No. 6,141,755."

FIG. 1 lists the steps of the method disclosed in the above-identified publication. The first step 1 is initializing a database and a connection-oriented network approved list, where the database contains rules for allowing and denying access concerning connection-oriented network flows, and where the connection-oriented approved list includes approvals of flows carrying ATM signaling information and ATM data.

The next step 2 is receiving a datagram. The present invention uses the term datagram to mean a unit of information. Acceptable units of information for the method of FIG. 1 includes an ATM signaling segment or an ATM data segment.

The next step 3 is identifying the type of the datagram (i.e., ATM signaling segment or ATM data segment).

The next step 4 is allowing the datagram access to the information processing network, recording that the datagram was allowed access to the information processing network, and comparing the connection request contained therein to the database if the datagram is an ATM signaling segment.

The next step 5 is adding the connection request to the connection-orientednetwork approved list if the connection request is approved by the database and returning to the second step 2. If the connection request is not approved by the database then return to the second step 2 without recording anything on the approved list.

The next step 6 is allowing the datagram access to the information processing network, recording that the datagram was allowed access to the information processing network, and returning to the second step 2 if the datagram is an ATM data segment and is on the connection-oriented network approved list.

The next step 7 is discarding the datagram, recording that the datagram was denied access to the information processing network, and returning to the second step 2 if the datagram is an ATM data segment and is not on the connection-oriented network approved list.

FIG. 2 is a schematic of a device 20 that implements the method disclosed in the above-identified publication. The device 20 includes a flow management unit 21, having a first input/output bus 22 for receiving a flow, having a second input/output bus 23 for transmitting a flow, and having a third input/output bus 24. A connection-oriented approved list storage unit 25 has a first input/output bus 26 and a second input/output bus 27. A connection-oriented flow processor 28 is connected to the input/output bus 26 of the connection-oriented approved list storage unit 25 and is connected to the third input/output bus 24 of the flow management unit 21. A flow command processor 29 is connected to the first input bus 27 of the connection-oriented approved list storage unit 25, is connected to the third input/output bus 24 of the flow management unit 21, and has an input/output bus 30. A connection-oriented (e.g., ATM) signaling flow processor 31 is connected to the input/output bus 30 of the flow command processor 29 and has an input/output bus 32. A connection-oriented signaling address database unit 33 is connected to the input/output bus 32 of the connection-oriented signaling flow processor 31. A memory management unit 34 is connected to the third input/output bus 24 of the flow management unit 21 and has an input/output bus 35. A memory unit 36 is connected to the input/output bus 35 of the memory management unit 34.

The method and device disclosed in the above-identified publication are each a firewall that only processes connection-oriented signaling segments and connection-oriented data segments. The inventors of the present invention improved upon their work by inventing a device and method that processes connectionless network segments (e.g., IP packet segments) contained within connection-oriented network cells (e.g., ATM cells).

Other prior art that may be relevant to the present invention includes the following U.S. patents.

U.S. Pat. No. 5,606,668, entitled "SYSTEM FOR SECURING INBOUND AND OUTBOUND DATA PACKET FLOW IN A COMPUTER NETWORK," discloses a device for and method of using a packet filter code that contains rules for determining whether or not a received packet should be allowed or denied access to the computer network. U.S. Pat. No. 5,606,668 requires that each packet received in all cases must be processed in accordance with the accept/reject rules. The present invention does not require that each packet received in all cases be analyzed in accordance with accept/reject rules. The processing burden required for each packet received makes the device and method of U.S. Pat. No. 5,606,668 not as efficient or secure as the device and method of the present invention. U.S. Pat. No. 5,606,668 is hereby incorporated by reference into the specification of the present invention.

U.S. Pat. No. 5,623,601, entitled "APPARATUS AND METHOD FOR PROVIDING A SECURE GATEWAY FOR COMMUNICATION AND DATA EXCHANGES BETWEEN NETWORKS," discloses a device for and method of screening data in accordance to the level of security required for the data. U.S. Pat. No. 5,623,601 requires an analysis of all of the received data in accordance with a security profile established by a security administrator. The processing burden required for each datagram received makes the device and method of U.S. Pat. No. 5,623,601 not as efficient and secure as the device and method of the present invention. U.S. Pat. No. 5,623,601 is hereby incorporated by reference into the specification of the present invention.

U.S. Pat. No. 5,802,320, entitled "SYSTEM FOR PACKET FILTERING OF DATA PACKETS AT A COMPUTER NETWORK INTERFACE," discloses a device for and method of screening data without adding any information of any network address pertaining to the screening process. This allows the screening system to function without being identified and, thus, more difficult to target by a hacker. U.S. Pat. No. 5,802,320 requires that each packet received be analyzed in accordance with accept/reject rules whereas the present invention does not. The processing burden required for each packet received makes the device and method of U.S. Pat. No. 5,802,320 not as efficient and secure as the device and method of the present invention. U.S. Pat. No. 5,802,320 is hereby incorporated by reference into the specification of the present invention.

U.S. Pat. No. 5,826,014, entitled "FIREWALL SYSTEM FOR PROTECTING NETWORK ELEMENTS CONNECTED TO A PUBLIC NETWORK," discloses a device for and method of a firewall. U.S. Pat. No. 5,826,014 requires that each datagram received be analyzed in accordance with accept/reject rules whereas the present invention does not. The processing burden required for each datagram received makes the device and method of U.S. Pat. No. 5,826,014 not as efficient and secure as the device and method of the present invention. U.S. Pat. No. 5,826,014 is hereby incorporated by reference into the specification of the present invention.

U.S. Pat. No. 5,828,844, entitled "INTERNET NCP OVER ATM," discloses a device for and method of a transmitting an IP data packet, ATM signaling, or ATM data. U.S. Pat. No. 5,828,844 does not disclose an efficient and hacker resistant firewall for receiving IP data packets, ATM signaling, and ATM data as does the present invention. U.S. Pat. No. 5,828,844 is hereby incorporated by reference into the specification of the present invention.

U.S. Pat. No. 5,828,833, entitled "METHOD AND SYSTEM FOR ALLOWING REMOTE PROCEDURE CALLS THROUGH A NETWORK FIREWALL," discloses a device for and method of allowing remote procedure calls through a firewall if the application server from which the request was made appears on an access control list. The access control list appears to be manually maintained. There does not appear to be any rules for automatically adding an application server to the access control list based on an analysis of the incoming request as in the present invention. U.S. Pat. No. 5,828,833 is hereby incorporated by reference into the specification of the present invention.

U.S. Pat. No. 5,828,846, entitled "CONTROLLING PASSAGE OF PACKETS OR MESSAGES VIA A VIRTUAL CONNECTION OR FLOW," discloses a method of a firewall that applies the accept/reject rules to every packet received that concerns flow management (i.e., signaling rather than data) whereas the present invention does not. The processing burden required for each packet received concerning connectivity makes the method of U.S. Pat. No. 5,828,846 not as efficient and secure as the device and method of the present invention. U.S. Pat. No. 5,828,846 is hereby incorporated by reference into the specification of the present invention.

U.S. Pat. No. 5,835,726, entitled "SYSTEM FOR SECURING THE FLOW OF AND SELECTIVELY MODIFYING PACKETS IN A COMPUTER NETWORK," discloses a device for and a method of a firewall that applies the accept/reject rules to every packet received whereas the present invention does not. The processing burden required for each packet received makes the device and method of U.S. Pat. No. 5,835,726 not as efficient and secure as the device and method of the present invention. U.S. Pat. No. 5,835,726 is hereby incorporated by reference into the specification of the present invention.

U.S. Pat. No. 5,835,727, entitled "METHOD AND APPARATUS FOR CONTROLLING ACCESS TO SERVICES WITHIN A COMPUTER NETWORK," discloses a device for and a method of a firewall that applies the accept/reject rules to every datagram received whereas the present invention does not. The processing burden required for each datagram received makes the device and method of U.S. Pat. No. 5,835,727 not as efficient and secure as the device and method of the present invention. U.S. Pat. No. 5,835,727 is hereby incorporated by reference into the specification of the present invention.

SUMMARY OF THE INVENTION

It is an object of the present invention to allow a datagram access to an information processing network, where the datagram is a unit of information, where the datagram is compared only once, if at all, to a database containing rules for allowing access.

It is another object of the present invention to allow a datagram access to an information processing network, where the datagram is compared only once, if at all, to a database containing rules for allowing access, and where the datagram may be a connection-oriented network signaling segment, a connection-oriented network data segment that does not include a connectionless network packet segment, or a connection-oriented network data segment that does include a connectionless network packet segment.

It is another object of the present invention to allow a datagram access to an information processing network, where the datagram is compared only once, if at all, to a database containing rules for allowing access; where the datagram may be a connection-oriented network signaling segment, a connection-oriented network data segment that does not include a connectionless network packet segment, or a connection-oriented network data segment that does include a connectionless packet segment; and where each allowance or denial of access is recorded.

It is another object of the present invention to allow a datagram access to an information processing network, where the datagram is compared only once, if at all, to a database containing rules for allowing access; where the datagram may be a connection-oriented network signaling segment, a connection-oriented network data segment that does not include a connectionless network packet segment, or a connection-oriented network data segment that does include a connectionless network packet segment; where each allowance or denial of access is recorded; and where a system administrator is alerted if the number of denials for a particular datagram exceeds a user-definable threshold or exceeds a user-definable threshold within a user-definable span of time.

The present invention is a device for and method of accessing an information processing network so that a datagram received that is not already pre-approved or pre-disapproved is compared only once to the rules for acceptance or rejection. A datagram is a unit of information. The present invention only allows access to the information network to datagrams that are either a connection-oriented (e.g., ATM) signaling segment, a connection-oriented data segment that excludes a connectionless network (e.g., WP) packet segment, or a connection-oriented network data segment that includes a connectionless network packet segment.

The allowable datagrams are referred to as segments because they are, typically, only portions of some higher level of information. For example, an ATM signalling segment is a portion of one or more ATM signalling cells that is requesting a certain transmission path be established over which one or more ATM data cells will be transmitted in portions known as ATM data segments. An IP packet is, typically, transmitted in portions as IP packet segments. The segments contain enough information to allow reconstruction of the higher level information entity to which the segments pertain.

Since much computation time is taken up with an exhaustive comparison of a new datagram against the rules for acceptance or rejection, only having to do this comparison the first time a datagram with a particular set of security parameters is encountered results in a maximally efficient firewall. The rules for acceptance or rejection of a datagram are contained within a database that includes rules for accepting connection-oriented network cells, where the term cells include segments of any type, and connectionless network packet segments. The rules may not only be based solely on one type of network (e.g., connection-oriented or connectionless) but also one type of network in relationship to another type of network. No known firewall other than the present invention is know that allows such processing of a datagram.

In the preferred embodiment, the first step is initializing a database, a connection-oriented network approved list, a connectionless network approved list, and a connectionless network disapproved list.

The second step is receiving a datagram. The datagram is a unit of information. The present invention is accepts datagram that are either connection-oriented network signalling segments, connection-oriented data segments that do not include connectionless network packet segments, or connection-oriented data segments that include connectionless packets segments.

The third step is discarding the datagram and returning to the second step if the datagram is not on the connection-oriented network approved list.

The fourth step is determining the type of the datagram (i.e., connection-oriented network signalling segments, connection-oriented data segments that do not include connectionless network packet segments, or connection-oriented data segments that include connectionless packets segments).

The fifth step is allowing the datagram access to the information processing network and comparing the corresponding connection request to the database if the datagram is a connection-oriented network signaling segment.

The sixth step is returning to the second step if the datagram is a connection-oriented network signaling segment and the database denies the connection request of the fifth step.

The seventh step is adding the connection request of the fifth step to the connection-oriented network approved list and returning to the second step if the datagram is a connection-oriented signaling segment and the database allows the connection request.

The eighth step is allowing the datagram access to the information processing network and returning to the second step if the datagram is a connection-oriented network data segment that excludes a connectionless network packet segment and the corresponding connection request is on the connection-oriented network approved list.

The ninth step is computing a flow tag if the datagram is a connection-oriented network data segment that includes a connectionless network packet segment. The present invention is able to allow access to the information processing network to flows that are just connection-oriented network flows, just connectionless network flows that are merely embedded in a connection-oriented network flow for transmission purposes, or connection-oriented network flows that have some relationship with a connectionless network flow (either the connection-oriented network flow in which the connectionless network flow is transmitted or some other connection-oriented flow). This allows the present invention to enforce a security policy within an approved connection-oriented network flow. The present invention is the only device and method that has this capability.

The tenth step is discarding the datagram and returning to the second step if the flow tag is on the connectionless network disapproved list.

The eleventh step is allowing the datagram access to the information processing network and returning to the second step if the flow tag is on the connectionless network approved list.

The twelfth step is comparing the flow tag to the database if the flow tag is not on the connectionless network approved list or the connectionless network disapproved list.

The thirteenth step is discarding the datagram, adding the flow tag to the connectionless network disapproved list, and returning to the second step if the database rejects the flow tag.

The fourteenth, and last, step is allowing the datagram access to the information processing network, adding the flow tag to the connectionless network approved list, and returning to the second step if the database accepts the flow tag.

No other firewall is known that performs this "one-touch" approach on connection-oriented network signaling segments, connection-oriented data segments that exclude a connectionless packet segment, and connection-oriented network data segments that include a connectionless packet segment.

The method of the present invention may include a step of recording all allowances of access to the information processing network, recording all discarded datagrams, and alerting a system administrator of any system activity that is worthy of immediate attention.

The device of the present invention that implements the method described above includes a flow management unit, a connection-oriented network approved list storage unit, a connection oriented network flow processor, a first connection-less network flow processor, a connectionless network approved list storage unit, a connectionless network disapproved list storage unit, a flow command processor, a connection-oriented network signaling flow processor, a connection-oriented network signaling address database unit, a second connectionless network flow processor, a connectionless network address database unit, a memory management unit, a memory unit, and a cell identification processor.

DETAILED DESCRIPTION

For clarity, the present invention will be described using ATM as the connection-oriented network and IP as the connectionless network, but any connection-oriented network and any connectionless network are intended to be included within the scope of the present invention. The connection-oriented network equivalent may be inserted wherever ATM is mentioned, and the connectionless network equivalent may be inserted wherever IP is mentioned.

The present invention is a device for and method of accessing an information processing network so that any datagram received that is not already pre-approved or pre-disapproved is compared only once to the rules for acceptance or rejection.

A datagram is a unit of information. The types of datagrams that will be allowed access to the information processing network include an ATM signaling segment, an ATM data segment that excludes an IP packet segment, or an ATM data segment that includes an IP packet segment. The acceptable datagrams are referred to as segments since they are only pieces of a larger entity. That is, an ATM signalling segment is a piece of one or more related ATM signalling cells which are used to make a request to establish a transmission path. The one or more ATM signalling cells are transmitted in pieces, or segments, to achieve the benefits offered by ATM. After transmission, the segments are reconstructed to form the one or more ATM signalling cells. An ATM data segment is a portion of one or more related ATM data cells that are used to transmit data. After transmission, the segments are reconstructed to form the one or more ATM data cells. The ATM data segments may or may not include IP packet segments. An IP packet segment is a portion of one or more IP packets. IP packets are transmitted in segments to achieve the benefit of an IP network. The segments are reconstructed after transmission. An IP packet segment may be embedded in an ATM data segment for transmission reasons or to implement a security policy that combines ATM and IP. Such a combination is believed to be new. The security policy is implemented in the rules contained in the database.

Figure 1:
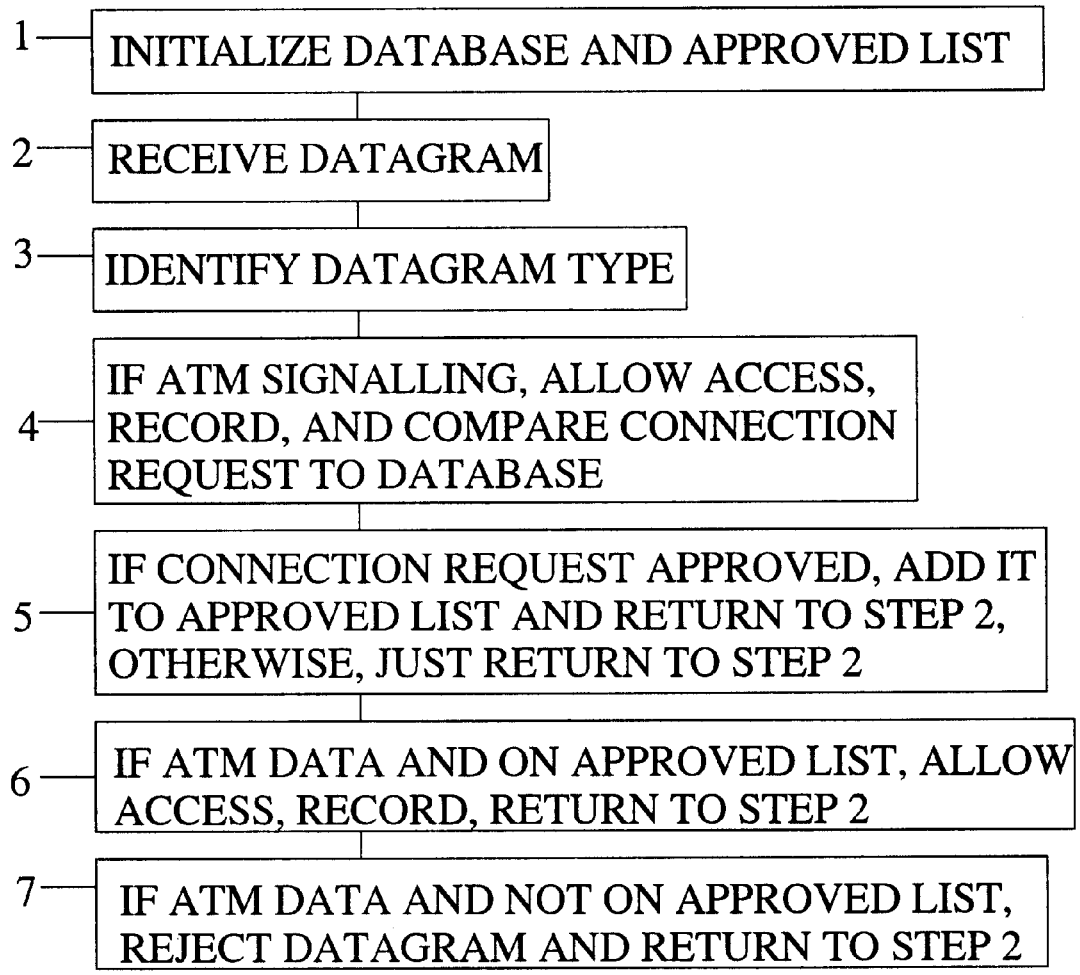
FIG. 1 is a list of the steps of a prior art method.
Figure 2:
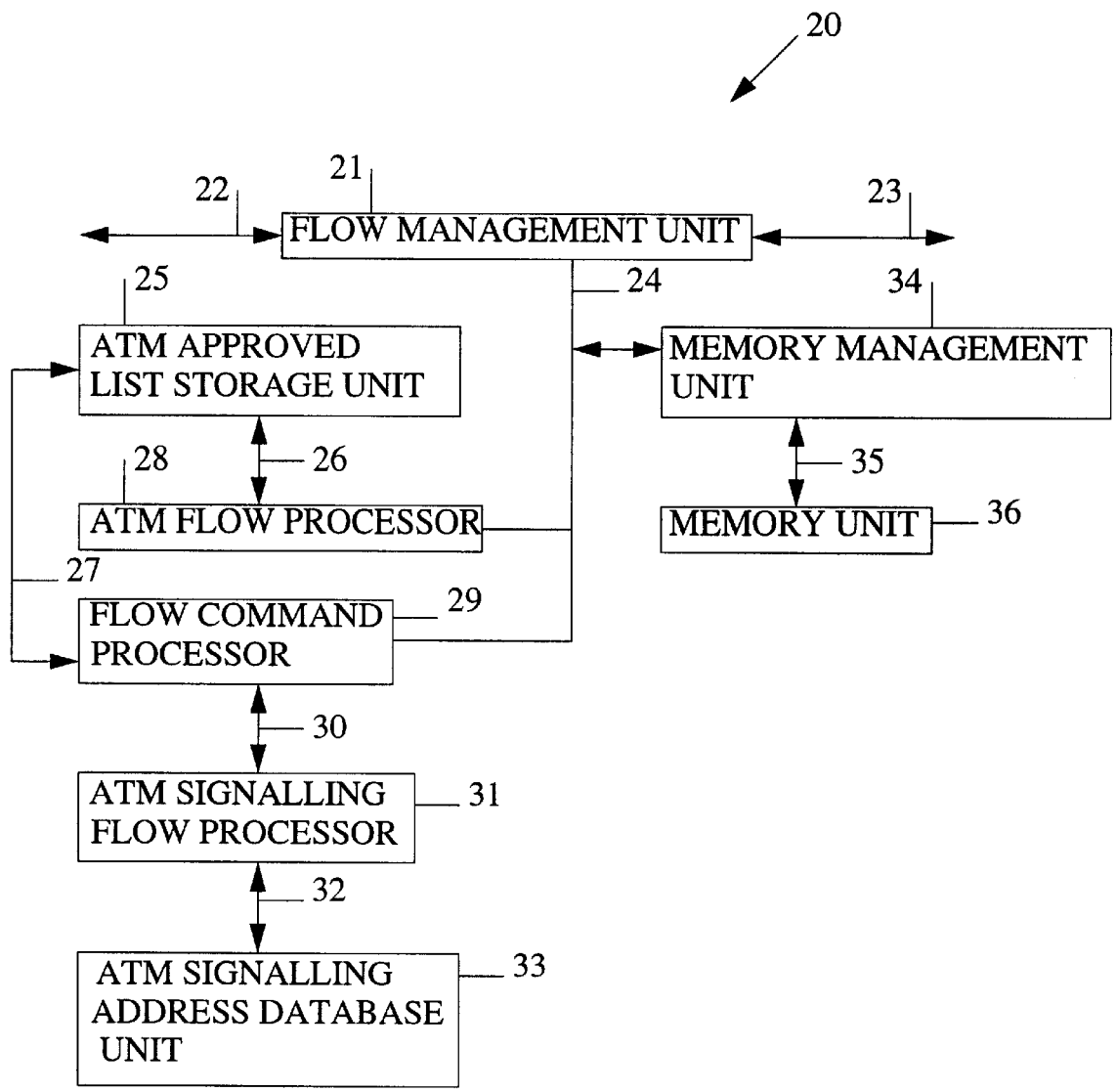
FIG. 2 is a schematic of a prior art device.
Figure 3:
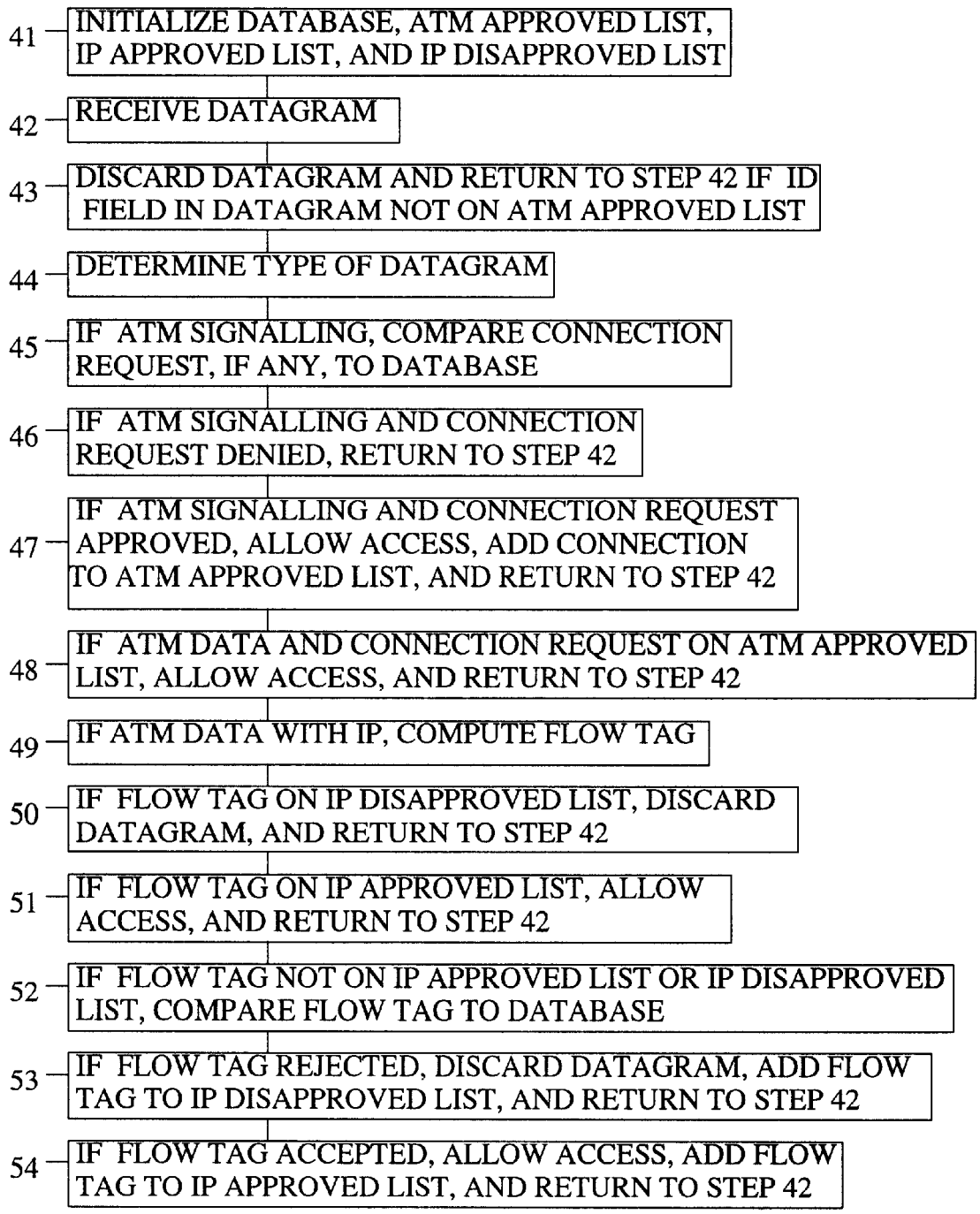
FIG. 3 is a list of steps of the preferred embodiment of the present method.

Since much computation time is taken up with an exhaustive comparison of a new datagram to the rules for acceptance or rejection, only having to do this comparison the first time a particular datagram is encountered results in a maximally efficient firewall. FIG. 3 lists the steps of the preferred embodiment of the present invention.

The first step 41 of the method is initializing a database, an ATM approved list, an IP approved list, and an IP disapproved list.

The database contains rules for allowing and denying access concerning ATM flows (e.g., ATM connection requests contained in one or more ATM signalling segments) and IP flow tags (e.g., flow tags computed from an IP packet segment). That is, the present invention has the ability to not only determine if a connection-oriented connection is allowed to be established but also what type of traffic is allowed to be transmitted over the connection (e.g., ATM data only, IP based data only, or a hybrid of ATM traffic and IP traffic).

The ATM approved list includes a list of approved ATM identifiers and approved transmission paths. An ATM identifier is based on the Virtual Path Indicator (VPI) and Virtual Channel Indicator (VCI) included within an ATM cell (i.e., an ATM signalling segment or an ATM data segment). The approved transmission paths are transmission paths that may be used to access the information processing network. Each ATM signaling segment includes not only an identifier but also a request (i.e., a connection request) to establish a certain transmission path over which the network elements will be communicating. Information about the requested transmission path is compared to the rules within the database. The rules stored in the database are used to determine whether or not the requested transmission path will be established.

The IP approved list includes approved flow tags, where each flow tag is computed from an IP packet segment included within an ATM data segment. An IP packet segment will be allowed access to the information processing network if its flow tag either appears on the IP approved list or is accepted after comparison to the rules contained within the database the first time that IP packet segment is received.

The IP disapproved list includes disapproved flow tags, where each flow tag is computed from an IP packet segment included within an ATM data segment. An IP packet segment will be denied access to the information processing network if its flow tag either appears on the IP disapproved list or is rejected after comparison to the rules contained within the database the first time the IP packet segment is received.

The second step 42 of the method is receiving a datagram. Units of information transmitted via ATM are commonly referred to as cells. The cells may be signalling (i.e., a connection request) or data. Typically, the cells are transmitted in segments. The segments are later recombined to form the cell. Units of information transmitted via IP are commonly referred to as packets. IP packets are also transmitted in segments. The types of datagrams that will be allowed access to the information processing network include an ATM signaling segment, an ATM data segment that does not include an IP packet segment, or an ATM data segment that includes an IP packet segment.

The third step 43 of the method is discarding the datagram and returning to the second step 42 if the indentifier included within the datagram (e.g., VPI and VCI) does not appear on the ATM approved list. Any ATM segment (signalling or data) that is not pre-approved is discarded immediately without any further processing. By doing this, computation time is not wasted on ATM segments that are not allowed access to the information processing network.

The fourth step 44 of the method is determining the type, of the datagram (e.g., an ATM signaling segment, an ATM data segment that does not include an IP packet segment, or an ATM data segment that does include an IP packet segment). An ATM segment includes an identification portion (e.g., VPI and VCP) and a payload portion. If an ATM segment is an ATM signaling segment then the payload portion may, or may not, contain a request to establish a certain transmission path (i.e., a connection request). A connection request may be identified in an ATM segment by the identification portion of the ATM segment and by looking at the payload portion of the ATM segment for the format of a connection request. If the format of signaling information is present then the datagram is identified as an ATM signaling segment. An ATM segment that does not include signaling information is identified as an ATM data segment. The payload of an ATM data segment may or may not include an IP packet segment. If the format of an IP packet segment is identified in the payload portion of an ATM data segment then the datagram is identified as an ATM data segment that includes an IP packet segment. If an ATM data segment does not include an IP packet segment then the datagram is identified as an ATM data segment that does not include an IP packet segment.

The fifth step 45 of the method is comparing the corresponding transmission-path connection request, if any, to the database if the datagram is an ATM signaling segment. Since all new connections are preceded by a connection request, the connection request must be compared against the rules for acceptance and rejection contained in the database prior to establishing the connection. If established, the connection will be used to receive ATM data segments that follow the one or more ATM signaling segments that requested the connection. The firewall of the present method can process ATM data segments that either include or exclude an IP packet segment. This is the first firewall that is able to process such a group of datagrams.

The sixth step 46 of the method is returning to the second step 42 if the datagram is an ATM signalling segment and the database denies any connection requested in the fifth step 45.

The seventh step 47 of the method is allowing access to the information processing network, adding the connection request to the ATM approved list, and returning to the second step 42 if the datagram is an ATM signalling segment and the database did not refuse the connection requested in the fifth step 45. Each connection request that is approved is only compared once against the database. Once a connection request is approved, it is added to the ATM approved list and need not be compared to the database again. Any subsequent ATM data segments associated with that connection will be pre-approved via a faster comparison to the ATM approved list, and no additional time will be wasted comparing it to the database. Such an approach may be thought of as a "one-touch" approach. This one-touch approach is applied at multiple levels: ATM signalling segment (connection setup), ATM data segment without an IP packet segment (ATM cell access), and ATM data segment that includes an IP packet segment (IP packet access). Such an approach is maximally efficient because it takes less time to make a comparison to an approved list or a disapproved list than it takes to do a comparison to the database which is more extensive.

The eighth step 48 of the method is allowing the datagram access to the information processing network and returning to the second step 42 if the datagram is an ATM data segment that excludes an IP packet segment and the corresponding connection request is on the ATM approved list. If the connection request is pre-approved then the ATM data segment is accepted without any further processing and no time is wasted comparing it to the database rules.

The ninth step 49 of the method is computing a flow tag if the datagram is an ATM data segment that includes an IP packet segment. The flow tag facilitates a fast comparison of the datagram to the IP approved list and the IP disapproved list. The flow tag also minimizes the amount of information that must be stored to do a comparison. Exactly how the flow tag is computed and used is described below.

The tenth step 50 of the method is discarding the datagram and returning to the second step 42 if the flow tag is on the IP disapproved list. The least amount of processing time is spent on the datagram if it is disapproved. This minimizes any time spent on unapproved ATM data segments that include IP packet segments and prevents the firewall of the present invention from becoming unavailable to any approved ATM data segments for wasting time processing disapproved ATM segments as do the prior art firewall methods and devices. The firewall of the present invention has superior performance when it receives a large number of disapproved ATM segments, where the ATM segments include or exclude IP packet segments.

The eleventh step 51 of the method is allowing the datagram access to the information processing network and returning to the second step 42 if the flow tag is on the IP approved list. If the datagram is approved then it is allowed access to the information processing network as quickly as possible.

The twelfth step 52 of the method is comparing the flow tag to the database if the flow tag is not on the IP approved list and is not on the IP disapproved list. This step will only be performed on ATM data segments that include an IP packet segment the first time such a segment is received. After such a segment is received, its flow tag will be placed on either the IP approved list or the IP disapproved list by one of the two steps that follow. In either case, subsequently received segments that have the same flow tag will not be compared to the database and will be processed as quickly as possible. This one touch approach to processing segments minimizes the amount of time the present invention takes to process a segment, enhances the performance of the present invention, and makes the present invention less susceptible to attack.

The thirteenth step 53 of the method is discarding the datagram, adding the flow tag to the IP disapproved list, and returning to the second step 42 if the database rejects the flow tag. After the firewall of the present invention analyzes a datagram for the first time, it need not do so again. If the datagram is rejected then its flow tag is added to the disapproved list to insure that processing time is not wasted when subsequent datagrams associated with this datagram are received.

The fourteenth, and last, step 54 of the method is allowing the datagram access to the information processing network, adding the flow tag to the IP approved list, and returning to the second step 42 if the database accepts the flow tag. Again, the firewall of the present invention minimizes the amount of processing time spent on subsequently received datagrams. If the flow tag of an IP packet segment was compared to the database and approved, as evidenced by the flow tag being placed on the approved list, then additional processing time need not be wasted comparing to the database subsequently received ATM data segments that include an IP packet segment that are associated with this datagram. No other firewall is known that performs this "one-touch" approach on ATM signalling segments, ATM data segments that exclude an IP packet segment, and ATM data segments that include an IP packet segment, in such a concerted fashion.

The method of the present invention may include a step of recording all allowances of access to the information processing network and recording all discarded datagrams. Such a recording may be reviewed by the system administrator on a regular basis to determine the number and source of legitimate requests for access and the number and source of inappropriate requests for access. If the number of illegitimate, or legitimate, requests for access exceed a user-definable threshold or a user-definable threshold within a user-definable span of time, the firewall may record such an occurrence or take the proactive step of alerting the system administrator of such an occurrence so that corrective action may be taken as soon as possible.

Figure 4:
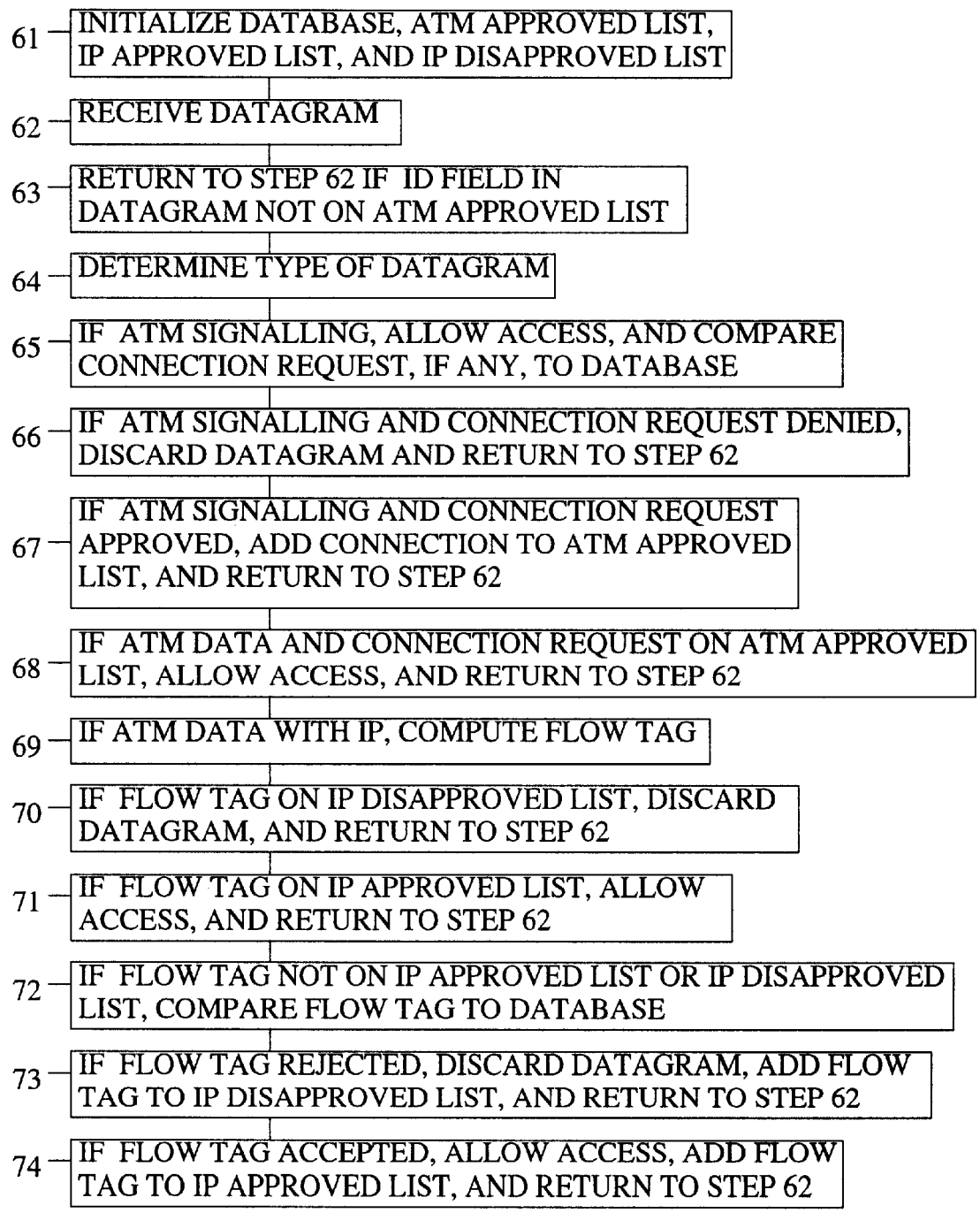
FIG. 4 is a list of steps of an alternate embodiment of the present method.

FIG. 4 lists the steps of an alternate embodiment of the present invention.

The first step 61 of the alternate method is initializing a database, an ATM approved list, an IP approved list, and an IP disapproved list.

The second step 62 of the alternate method is receiving a datagram.

The third step 63 of the alternate method is returning to the second step 62 if the indentifier included within the datagram (e.g., VPI and VCI) does not appear on the ATM approved list.

The fourth step 64 of the alternate method is determining the type of the datagram (e.g., ATM signaling segment, ATM data segment, or IP packet segment contained with an ATM data segment). An ATM segment (i.e., signalling or data) includes an identification portion (e.g., VPI and VCP) and a payload portion.

The fifth step 65 of the alternate method is allowing access to the information processing network and comparing the corresponding transmission-path connection request, if any, to the database if the datagram is an ATM signaling segment.

The sixth step 66 of the alternate method is discarding the datagram and returning to the second step 62 if the datagram is an ATM signalling segment and the database denies the connection request, if any, of the fifth step 65.

The seventh step 67 of the alternate method is adding the connection request, if any, to the ATM approved list and returning to the second step 62 if the datagram is an ATM signalling segment and the database allows the connection request, if any, of the fifth step 65.

The eighth step 68 of the alternate method is allowing the datagram access to the information processing network and returning to the second step 62 if the datagram is an ATM data segment that excludes an IP packet segment and the corresponding connection request is on the ATM approved list.

The ninth step 69 of the alternate method is computing a flow tag if the datagram is an ATM data segment that includes an IP packet segment. Exactly how the flow tag is computed and used is described below.

The tenth step 70 of the alternate method is discarding the datagram and returning to the second step 62 if the flow tag is on the IP disapproved list.

The eleventh step 71 of the alternate method is allowing the datagram access to the information processing network and returning to the second step 62 if the flow tag is on the IP approved list.

The twelfth step 72 of the alternate method is comparing the flow tag to the database if the flow tag is not on the IP approved list and is not on the IP disapproved list.

The thirteenth step 73 of the alternate method is discarding the datagram, adding the flow tag to the IP disapproved list, and returning to the second step 62 if the database rejects the flow tag.

The fourteenth, and last, step 74 of the alternate method is allowing the datagram access to the information processing network, adding the flow tag to the IP approved list, and returning to the second step 62 if the database accepts the flow tag.

Figure 5:
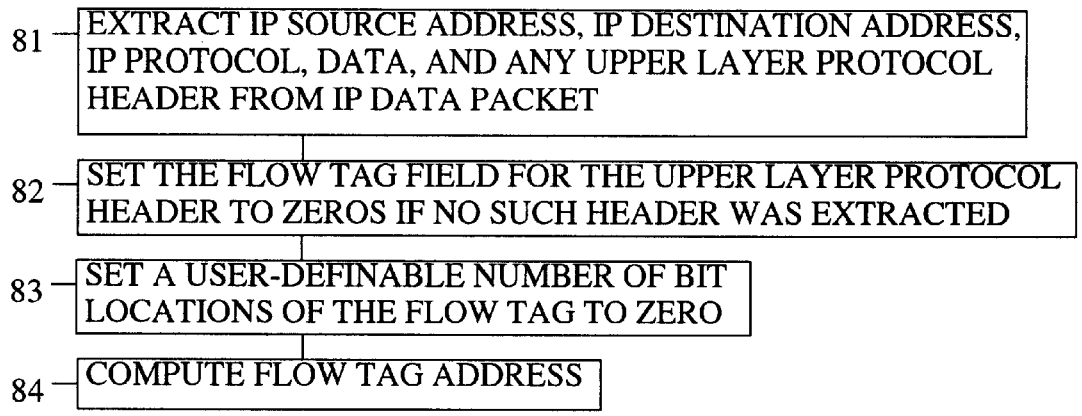
FIG. 5 is a list of steps for computing a flow tag.

FIG. 5 lists one method of computing a flow tag for an IP packet segment contained within an ATM data segment. Other methods of computing a flow tag may be used with the present invention.

The first step 81 is extracting an IP source address, an IP destination address, an IP protocol field, data, and an upper layer protocol header (e.g., TCP) from the header of the IP data packet. The IP packet segment may or may not contain an upper layer protocol header.

The second step 82 is assuming that the upper layer protocol header is all zeros if none was extracted from the IP packet segment. This simplifies the hardware that implements the present method by creating flow tags of uniform length even if some IP packet segments do not include an upper layer protocol header.

The third step 83 is setting certain user-definable bit locations of the extracted data, that may include an all-zero upper layer protocol header, each to zero. This step implements the security policy that the user wishes to employ by setting to zero, or masking, those bits in the IP packet segment that are of no interest to the user. For example, the user may not be interested in the IP source address when the IP packet segment is requesting access to a web page located on the information processing network but may be interested in the IP destination address to make sure that the destination is the web server on which the web page is located. The extracted and masked information is the flow tag for the IP packet segment.

The IP protocol field uniquely identifies the type of service that the IP packet segment is attempting to perform (e.g., telnet, web browser, ftp, etc.). The IP protocol field is used to determine which bits in the extracted information should be masked.

The fourth step 84 is to compute a flow tag address for the flow tag computed in the last step. The flow tag address is an address in both the IP approved list and the IP disapproved list at which the flow tag may be entered. If a flow tag appears on the IP approved list or the IP disapproved list at its corresponding flow tag address then the flow tag is pre-approved or pre-disapproved, respectively. If a flow tag does not appear on the IP approved list or the IP disapproved list but is approved or disapproved after comparing the flow tag to the rules contained in the database then the flow tag is stored on the IP approved list if approved or on the IP disapproved list if not approved. A flow tag address is useful for speeding up the search process. Instead of searching a large list to see if a flow tag is present, the flow tag address tells the information processing network where the flow tag may be found in the list if at all.

Since the IP packet segment is used to compute the flow tag and portions of it are common to all related IP packet segments, or all IP packet segments in a flow, then the same flow tag will be generated for each related IP packet segment, or each IP packet segment in the flow.

The IP packet segment of one flow may contain the same information as an IP packet segment from a different flow. Therefore, the flow tags will be the same for these IP packet segments from different flows.

The flow tag address in the preferred embodiment of the present method is fourteen bits long. Fourteen equations are used to compute the flow tag address. Other suitable address lengths and equations may be used. The flow tag address is computed by performing a bitwise exclusive-or operation of certain bits of the flow tag, where the flow tag address bits are represented by $(f_0, f_1, \ldots f_n)$, where the flow tag bits from the IP source address are represented by $(s_0, s_1, \ldots s_n)$, where the flow tag bits from the IP destination address are represented by $(d_0, d_1, \ldots, d_n)$, where the flow tag bits from the IP protocol are represented by $(p_0, p_1, \ldots, p_n)$ and where the upper layer protocol header are represented by $(h_0, h_1, \ldots, h_n)$ If there is no upper layer protocol header in the IP data packet then each bit location in $(_0, h_1, \ldots, h_n)$ will be a zero. Each bit of the flow tag address may be computed as follows, where x indicates an exclusive-or operation:

$f_0 = s_0 \times s_{14} \times s_{28} \times d_{13} \times d_{27} \times h_0 \times h_{16}$;
$f_1 = s_1 \times s_{15} \times s_{29} \times d_{12} \times d_{26} \times h_1 \times h_{17}$;
$f_2 = s_2 \times s_{16} \times s_{30} \times d_{11} \times d_{25} \times h_2 \times h_{18} \times p_0$;
$f_3 = s_3 \times s_{17} \times s_{31} \times d_{10} \times d_{24} \times h_3 \times h_{19} \times p_1$;
$f_4 = s_4 \times s_{18} \times d_9 \times d_{23} \times h_4 \times h_{20} \times p_2$;
$f_5 = s_5 \times s_{19} \times d_8 \times d_{22} \times h_5 \times h_{21} \times p_3$;
$f_6 = s_6 \times s_{20} \times d_7 \times d_{21} \times h_6 \times h_{22} \times h_{28} \times p_4$;
$f_7 = s_7 \times s_{21} \times d_6 \times d_{20} \times h_7 \times h_{23} \times h_{29} \times P_5$;
$f_8 = s_8 \times s_{22} \times d_5 \times d_{19} \times h_8 \times h_{24} \times h_{30} \times p_6$;
$f_9 = s_9 \times s_{23} \times d_4 \times d_{18} \times h_9 \times h_{25} \times h_{31} \times p_7$;
$f_{10} = s_{10} \times s_{24} \times d_3 \times d_{17} \times d_{31} \times h_{10} \times h_{26}$;
$f_{11} = s_{11} \times s_{25} \times d_2 \times d_{16} \times d_{30} \times h_{11} \times h_{27}$;
$f_{12} = s_{12} \times s_{26} \times d_1 \times d_{15} \times d_{29} \times h_{12} \times h_{14}$; and
$f_{13} = s_{13} \times s_{27} \times d_0 \times d_{14} \times d_{28} \times h_{13} \times h_{15}$.

The flow tag address provides a mechanism for quickly identifying pre-approved and pre-disapproved flows. Although the example above used certain IP protocol fields to generate the flow tag, the present invention is not limited to these fields. Any of the IP protocol fields (e.g., type of service, time to live, etc.) and fields within data payload may be used in any combination to generate the flow tag.

Figure 6:
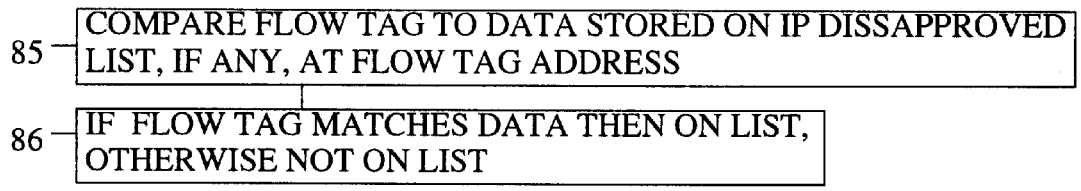
FIG. 6 is a list of steps for comparing a flow tag to an IP disapproved list.

FIG. 6 is a list of steps for determining whether or not a flow tag is on the IP disapproved list. The first step 85 is comparing the flow tag to the entries stored at the flow tag address in the IP disapproved list. The second step 86 is determining that the flow tag is on the IP disapproved list if a match occurred in the last step, otherwise determining that the flow tag is not on the IP disapproved list.

Figure 7:
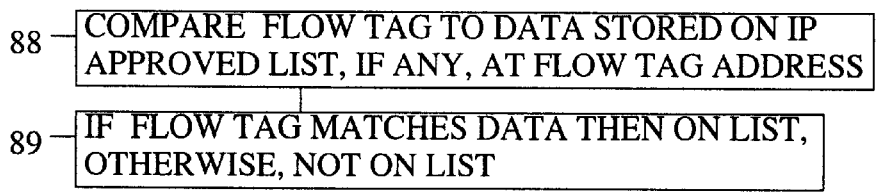
FIG. 7 is a list of steps for comparing a flow tag to an IP approved list.
Figure 8:
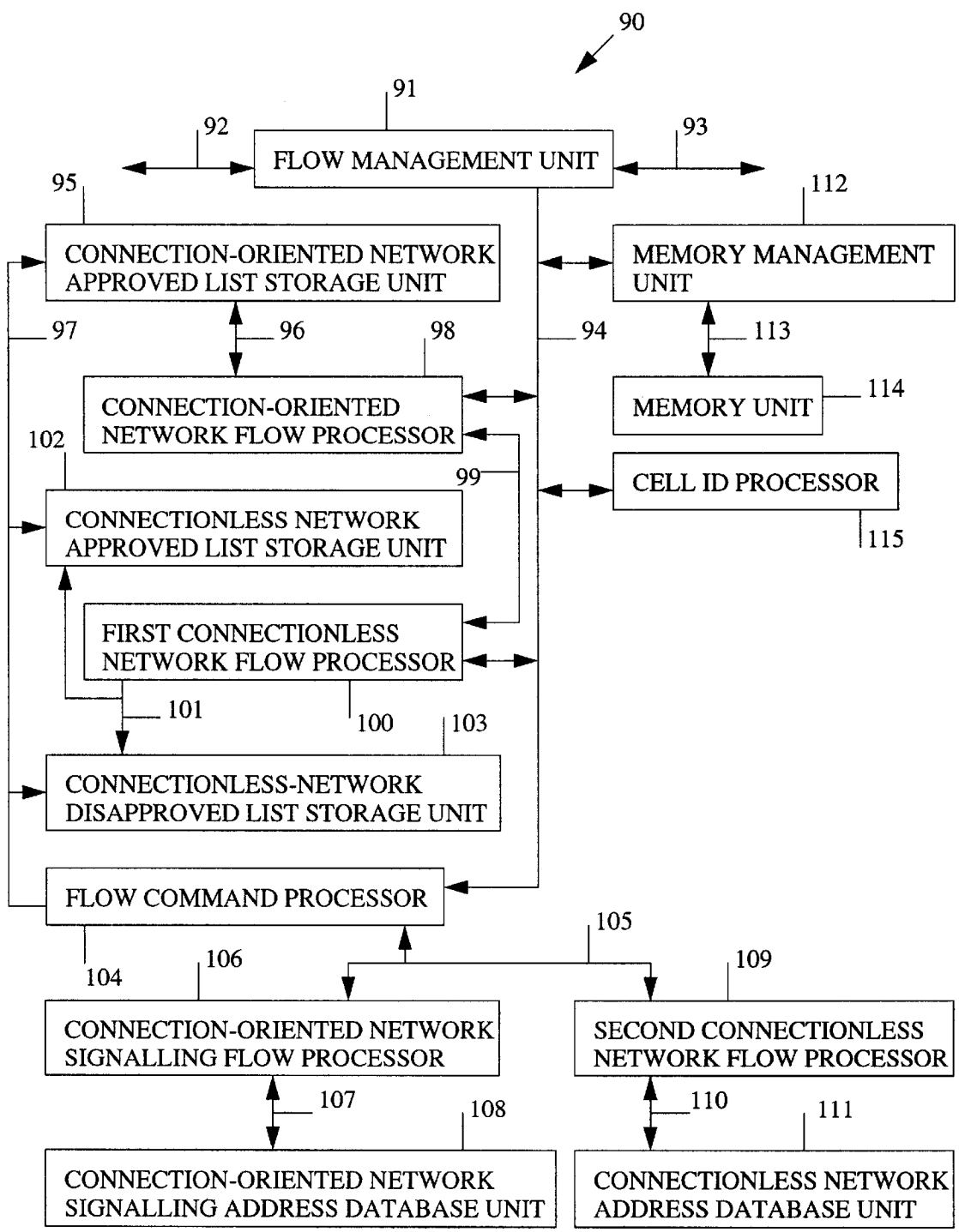
FIG 8 is a schematic of the present invention.

FIG. 7 is a list of steps for determining whether or not a flow tag is on the IP approved list. The first step 88 is comparing the flow tag to the entries stored at the flow tag address in the IP approved list. The second step 89 is determining that the flow tag is on the IP, approved list if a match occurred in the last step, otherwise determining that the flow tag is not on the IP approved list FIG. 8 is a schematic of a device 90 for accessing an information processing network that implements the method described above. The device 90 includes a flow management unit 91, having a first input/output bus 92 for receiving a flow, having a second input/output bus 93 for transmitting the flow, and having a third input/output bus 94. A connection-oriented network approved list storage unit 95 has a first input/output bus 96 and a second input/output bus 97. A connection-oriented network flow processor 98 is connected to the third input/output bus 94 of the flow management unit 91, is connected to the first input/output bus 96 of the connection-oriented network approved list storage unit 95, and has an input/output bus 99. A first connectionless network flow processor 100 is connected to the input/output bus 99 of the connection-oriented network flow processor 98, is connected to the third input/output bus 94 of the flow management unit 91, and has an input/output bus 101. A connectionless network approved list storage unit 102 is connected to the input/output bus 101 of the first connectionless network flow processor 100 and is connected to the first input/output bus 97 of the connection-oriented network approved list storage unit 95. A connectionless network disapproved list storage unit 103 is connected to the input/output bus 101 of the first connectionless network flow processor 100 and is connected to the first input/output bus 97 of the connection-oriented network approved list storage unit 95. A flow command processor 104 is connected to the first input/output bus 97 of the connection-oriented network approved list storage unit 95, is connected to the third input/output bus 94 of the flow management unit 91, and has an input/output bus 105. A connection-oriented network signaling flow processor 106 is connected to the input/output bus 105 of the flow command processor 104 and has an input/output bus 107. A connection-oriented network signaling address database unit 108 is connected to the input/output bus 107 of the connection-oriented network signal flow processor 106. A second connectionless network flow processor 109 is connected to the input/output bus 105 of the flow command processor 104 and has an input/output bus 110. A connectionless network address database unit 111 is connected to the input/output bus 110 of the second connectionless network flow processor 109. A memory management unit 112 is connected to the third input/output bus 94 of the flow management unit 91 and has an input/output bus 113. A memory unit 114 is connected to the input/output bus 113 of the memory management unit 112. A cell identification processor 115 is connected to the third input/output bus 94 of the flow management unit 91.

What is claimed is:

1. A method of accessing an information processing network, comprising the steps of:
   a) initializing a database, a connection-oriented network approved list, a connectionless network approved list, and a connectionless network disapproved list, where the database contains rules for allowing and denying access concerning connection-oriented network flows and connectionless network flows, where the connection-oriented network approved list includes approvals of connection-oriented network signaling segments and connection-oriented network data segments that exclude a connectionless network packet segment, where the connectionless network approved list includes approvals of flows of connection-oriented network data segments that include a connectionless network packet segment, and where the connectionless network disapproval list includes disapprovals of connection-oriented network data segments that include a connectionless network packet segment;
   b) receiving a datagram;
   c) discarding the datagram and returning to step (b) if the datagram is not on the connection-oriented network approved list;
   d) determining the datagram's type;
   e) if the datagram is a connection-oriented network signaling segment and includes a request to establish a transmission path them comparing the request to;
   f) returning to step (b) if the datagram is a connection-oriented network signaling segment and the database denies the request to establish the transmission path;
   g) allowing access to the information processing network, adding the requested transmission path to the connection-oriented network approved list, and returning to step (b) if the datagram is a connection-oriented network signaling segment and the database approves the request to establish the transmission path;
   h) allowing the datagram access to the information processing network and returning to step (b) if the datagram is a connection-oriented network data segment that excludes an IP packet segment and is on the connection-oriented network approved list;
   i) computing a flow tag if the datagram is a connection-oriented network data segment that includes a connectionless network packet segment;
   j) discarding the datagram and returning to step (b) if the flow tag is on the connectionless network disapproved list;
   k) allowing the datagram access to the information processing network and returning to step (b) if the flow tag is on the connectionless network approved list;
   l) comparing the flow tag to the database if the flow tag is not on the connectionless network approved list and is not on the connectionless network disapproved list;
   m) discarding the datagram, adding the flow tag to the connectionless network disapproved list, and returning to step (b) if the database rejects the flow tag; and
   n) allowing the datagram access to the information processing network, adding the flow tag to the connectionless network approved list, and returning to step (b) if the database accepts the flow tag.

2. The method of claim 1, wherein said step of determining the datagram's type is comprised of the steps of:
   a) extracting a virtual path indicator, a virtual channel indicator, and any formatting information from the datagram;
   b) using the result of step (a) to determine if the datagram is of the type selected from the group consisting of connection-oriented network signaling segment, connection-oriented network data segment that excludes a connectionless network packet segment, and a connection-oriented network data segment that includes a connectionless network packet segment.

3. The method of claim 1, wherein said step of computing a flow tag is comprised of the steps of:

a) extracting from the connectionless network packet segment a connectionless source address, a connectionless destination address, a connectionless protocol, data, and an upper layer protocol header if included in the connectionless network packet segment;

b) substituting all zeros for the upper layer protocol layer if none is included in the connectionless network packet segment;

c) setting a user-definable number and location of bits in the result of the last step to zero; and d) computing a flow tag address.

4. The method of claim 3, where said step of computing a flow tag address is comprised of the steps of:

a) setting a zeroth bit of the flow tag address to $f_0=s_0 \times s_{14} \times s_{28} \times d_{13} \times d_{27} \times h_0 \times h_{16}$, where x is a bitwise exclusive-or operation, $f_i$ is the ith bit of the flow tag address, where $s_i$ is the ith bit of a connectionless network source address, where $d_i$ is the ith bit of a connectionless network destination address, where $p_i$ is the ith bit of a connectionless network protocol, and where $h_i$ is the ith bit of the upper layer protocol header, and;

b) setting a first bit of the flow tag address to $f_1=s_1 \times s_{15} \times s_{29} \times d_{12} \times d_{26} \times h_1 \times h_{17}$;

c) setting a second bit of the flow tag address to $f_2=s_2 \times s_{16} \times s_{30} \times d_{11} \times d_{25} \times h_2 \times h_{18} \times P_0$;

d) setting a third bit of the flow tag address to $f_3=s_3 \times s_{17} \times s_{31} \times d_{10} \times d_{24} \times h_3 \times h_{19} \times p_1$;

e) setting a fourth bit of the flow tag address to $f_4=s_4 \times s_{18} \times d_9 \times d_{23} \times h_4 \times h_{20} \times p_2$;

f) setting a fifth bit of the flow tag address to $f_5=s_5 \times s_{19} \times d_8 \times d_{22} \times h_5 \times h_{21} \times p_3$;

g) setting a sixth bit of the flow tag address to $f_6=s_6 \times s_{20} \times d_7 \times d_{21} \times h_6 \times h_{22} \times h_{28} \times p_4$;

h) setting a seventh bit, of the, flow tag address to $f_7=s_7 \times s_{21} \times d_6 \times d_{20} \times h_7 \times h_{23} \times h_{29} \times p_5$;

i) setting a eighth bit of thee flow tag address to $f_8=s_8 \times s_{22} \times d_5 \times d_{19} \times h_8 \times h_{24} \times h_{30} \times p_6$;

j) setting a ninth bit of the flow tag ad dress to $f_9=s_9 \times s_{23} \times d_4 \times d_{18} \times h_9 \times h_{25} \times h_{31} \times p_7$;

k) setting a tenth bit of the flow tag address to $f_{10}=s_{10} \times s_{24} \times d_3 \times d_{17} \times d_{31} \times h_{10} \times h_{26}$;

l) setting a eleventh bit of the flow tag address to $f_{11}=s_{11} \times s_{25} \times d_2 \times d_{16} \times d_{30} \times h_{11} \times h_{27}$;

m) setting a twelfth bit of the flow tag address to $f_{12}=s_{12} \times s_{26} \times d_1 \times d_{15} \times d_{29} \times h_{12} \times h_{14}$; and n) setting a thirteenth bit of the flow tag address to $f_{13}=s_{13} \times s_{27} \times d_0 \times d_{14} \times d_{28} \times h_{13} \times h_{15}$.

5. The method claim 1, wherein the step of discarding the datagram, adding the flow tag to the connectionless disapproved list, and returning to step (b) if the database rejects the flow tag is comprised of the steps of:

a) comparing the flow tag to any data stored on the connectionless network disapproved list at the flow tag address;

b) determining that the flow tag is on the connectionless network disapproved list if a match occurred in the last step;

c) discarding the datagram;

d) adding the flow tag to the connectionless network disapproved list; and e) returning to step (b).

6. The method claim 1, wherein the step of allowing the datagram access to the information processing network, adding the flow tag to the connectionless network approved list, and returning to step (b) if the database accepts the flow tag is comprised of the steps of:

a) comparing the flow tag to any data stored on the connectionless network approved list at the flow tag address;

b) determining that the flow tag is on the connectionless network approved list if a match occurred in the last step;

c) allowing the datagram access to the information processing network;

d) adding the flow tag to the connectionless network approved list; and e) returning to step (b).

7. The method of claim 1, wherein said connection-oriented network is an ATM network and where said connectionless network is an IP network.

8. The method of claim 1, wherein said step of initializing a database comprises the step of initializing a database with rules for accepting and rejecting connection-oriented network flows that are unrelated to connectionless network flows, connection-oriented network flows that are related to connectionless network flows, and connectionless network flows that are related to connection-oriented network flows.

9. The method of claim 1, further including the step of recording all allowances of access to the information processing network and recording all discarded datagrams.

10. The method of claim 9, further including the step of alerting a system administrator if the number of discardings recorded from a particular datagram exceeds a user-definable threshold.

11. The method of claim 9, further including the step of alerting a system administrator if the number of discardings recorded from a particular datagram exceeds a user-definable threshold within a user-definable span of time.

12. A method of accessing an information processing network, comprising the steps of:

a) initializing a database, a connection-oriented network approved list, a connectionless network approved list, and a connectionless network disapproved list, where the database contains rules for allowing and denying access concerning connection-oriented network flows and connectionless network flows, where the connection-oriented network approved list includes approvals of connection-oriented network signaling segments and connection-oriented network data segments that exclude a connectionless network packet segment, where the connectionless network approved list includes approvals of flows of connection-oriented network data segments that include a connectionless network packet segment, and where the connectionless network disapproval list includes disapprovals of connection-oriented network data segments that include a connectionless network packet segment;

receiving a datagram;

c) returning to step (b) if the datagram is not on the connection-oriented network approved list;

d) determining the datagram's type;

e) if the datagram is a connection-oriented network signaling segment, allowing the datagram access to the information processing network and, if the datagram contains a request to establish a transmission path, comparing the request to the database;

f) discarding the datagram; and returning to step (b) if the datagram is a connection-oriented network signaling segment and the database denies the request to establish the transmission path;

g) adding the requested transmission path to the connection-oriented network approved list and returning to step (b) if the datagram is a connection-oriented network signaling segment and the database approves the request to establish the transmission path;

h) allowing the datagram access to the information processing network and returning to step (b) if the datagram is a connection-oriented network data segment that excludes an IP packet segment and is on the connection-oriented network approved list;

i) computing a flow tag if the datagram is a connection-oriented network data segment that includes a connectionless network packet segment;

j) discarding the datagram and returning to step (b) if the flow tag is on the connectionless network disapproved list;

k) allowing the datagram access to the information processing network and returning to step (b) if the flow tag is on the connectionless network approved list;

l) comparing the flow tag to the database if the flow tag is not on the connectionless network approved list and is not on the connectionless network disapproved list;

m) discarding the datagram, adding the flow tag to the connectionless network disapproved list, and returning to step (b) if the database rejects the flow tag; and n) allowing the datagram access to the information processing network, adding the flow tag to the connectionless network approved list, and returning to step (b) if the database accepts the flow tag.

13. The method of claim 12, wherein said step of determining the datagram's type is comprised of the steps of:

a) extracting a virtual path indicator, a virtual channel indicator, and any formatting information from the datagram;

b) using the result of step (a) to determine if the datagram is of the type selected from the group consisting of connection-oriented network signaling segment, connection-oriented network data segment that excludes a connectionless network packet segment, and a connection-oriented network data segment that includes a connectionless network packet segment.

14. The method of claim 12, wherein said step of computing a flow tag is comprised of the steps of:

a) extracting from the connectionless network packet segment a connectionless source address, a connectionless destination address, a connectionless protocol, data, and an upper layer protocol header if included in the connectionless network packet segment;

b) substituting all zeros for the upper layer protocol layer if none is included in the connectionless network packet segment;

c) setting a user-definable number and location of bits in the result of the last step to zero; and d) computing a flow tag address.

15. The method of claim 14, where said step of computing a flow tag address is comprised of the steps of:

a) setting a zeroth bit of the flow tag address to $f_0=s_0 \times s_{14} \times s_{28} \times d_{13} \times d_{27} \times h_0 \times h_{16}$, where x is a bitwise exclusive-or operation, $f_i$ is the ith bit of the flow tag address, where $s_i$ is the ith bit of a connectionless network source address, where $d_i$ is the ith bit of a connectionless network destination address, where $p_i$ is the ith bit of a connectionless network protocol, and where $h_i$ is the ith bit of the upper layer protocol header, and;

b) setting a first bit of the flow tag address to $f_1=s_1 \times s_{15} \times s_{29} \times d_{12} \times d_{26} \times h_1 \times h_{17}$;

c) setting a second bit of the flow tag address to $f_2=s_2 \times s_{16} \times s_{30} \times d_{11} \times d_{25} \times h_2 \times h_{18} \times p_0$;

d) setting a third bit of the flow tag address to $f_3=s_3 \times s_{17} \times s_{31} \times d_{10} \times d_{24} \times h_3 \times h_{19} \times p_1$;

e) setting a fourth bit of the flow tag address to $f_4=s_4 \times s_{18} \times d_9 \times d_{23} \times h_4 \times h_{20} \times p_2$;

f) setting a fifth bit of the flow tag address to $f_5=s_5 \times s_{19} \times d_8 \times d_{22} \times h_5 \times h_{21} \times p_3$;

g) setting a sixth bit of the flow tag address to $f_6=s_6 \times s_{20} \times d_7 \times d_{21} \times h_6 \times h_{22} \times h_{28} \times p_4$;

h) setting a seventh bit of the flow tag address to $f_7=s_7 \times s_{21} \times d_6 \times d_{20} \times h_7 \times h_{23} \times h_{29} \times p_5$;

i) setting a eighth bit of the flow tag address to $f_8=s_8 \times s_{22} \times d_5 \times d_{19} \times h_8 \times h_{24} \times h_{30} \times p_6$;

j) setting a ninth bit of the flow tag address to $f_9=s_9 \times s_{23} \times d_4 \times d_{18} \times h_9 \times h_{25} \times h_{31} \times p_7$;

k) setting a tenth bit of the flow tag address to $f_{10}=s_{10} \times s_{24} \times d_3 \times d_{17} \times d_{31} \times h_{10} \times h_{26}$;

l) setting a eleventh bit of the flow tag address to $f_{11}=s_{11} \times s_{25} \times d_2 \times d_{16} \times d_{30} \times h_{11} \times h_{27}$;

m) setting a twelfth bit of the flow tag address to $f_{12}=s_{12} \times s_{26} \times d_1 \times d_{15} \times d_{29} \times h_{12} \times h_{14}$; and n) setting a thirteenth bit of the flow tag address to $f_{13}=s_{13} \times s_{27} \times d_0 \times d_{14} \times d_{28} \times h_{13} \times h_{15}$.

16. The method claim 12, wherein the step of discarding the datagram, adding the flow tag to the connectionless network disapproved list, and returning to step (b) if the database rejects the flow tag is comprised of the steps of:

a) comparing the flow tag to any data stored on the connectionless network disapproved list at the flow tag address;

b) determining that the flow tag is on the connectionless network disapproved list if a match occurred in the last step;

c) discarding the datagram;

d) adding the flow tag to the connectionless network disapproved list; and e) returning to step (b).

17. The method claim 12, wherein the step of allowing the datagram access to the information processing network, adding the flow tag to the connectionless network approved list, and returning to step (b) if the database accepts the flow tag is comprised of the steps of:

a) comparing the flow tag to any data stored on the connectionless network approved list at the flow tag address;

b) determining that the flow tag is on the connectionless network approved list if a match occurred in the last step;

c) allowing the datagram access to the information processing network;

d) adding the flow tag to the connectionless network approved list; and e) returning to step (b).

18. The method of claim 12, wherein said connection-oriented network is an ATM network and where said connectionless network is an IP network.

19. The method of claim 12, wherein said step of initializing a database comprises the step of initializing a database with rules for accepting and rejecting ATM network flows that are unrelated to IP network flows, ATM network flows that are related to IP network flows, and IP network flows that are related to ATM network flows.

20. The method of claim 12, further including the step of recording all allowances of access to the information processing network and recording all discarded datagrams.

21. The method of claim 20, further including the step of alerting a system administrator if the number of discardings recorded from a particular datagram exceeds a user-definable threshold.

22. The method of claim 20, further including the step of alerting a system administrator if the number of discardings recorded from a particular datagram exceeds a user-definable threshold within a user-definable span of time.

* * * * *